(12) United States Patent
Miyajima

(10) Patent No.: US 8,990,350 B2
(45) Date of Patent: Mar. 24, 2015

(54) WEB SERVICE SYSTEM, WEB SERVICE METHOD, AND PROGRAM

(75) Inventor: Hiroaki Miyajima, Tokyo (JP)

(73) Assignee: NEC Corporation, Tokyo (JP)

( * ) Notice: Subject to any disclaimer, the term of this patent is extended or adjusted under 35 U.S.C. 154(b) by 621 days.

(21) Appl. No.: 12/702,002

(22) Filed: Feb. 8, 2010

(65) Prior Publication Data
US 2010/0241734 A1 Sep. 23, 2010

(30) Foreign Application Priority Data

Mar. 19, 2009 (JP) .................................. 2009-067900
Dec. 8, 2009 (JP) .................................. 2009-278713

(51) Int. Cl.
*G06F 15/16* (2006.01)
*H04L 29/06* (2006.01)
*G06F 9/455* (2006.01)

(52) U.S. Cl.
CPC .......... *H04L 63/166* (2013.01); *G06F 9/45558* (2013.01); *G06F 2009/4557* (2013.01)
USPC ................ 709/219; 709/227; 709/200; 718/1

(58) Field of Classification Search
USPC .............. 709/201–226, 200, 227; 705/1–20, 705/80–85; 718/1; 707/754
See application file for complete search history.

(56) References Cited

U.S. PATENT DOCUMENTS

| | | | |
|---|---|---|---|
| 2007/0198656 A1* | 8/2007 | Mazzaferri et al. | 709/218 |
| 2009/0204964 A1* | 8/2009 | Foley et al. | 718/1 |
| 2009/0249284 A1* | 10/2009 | Antosz et al. | 717/104 |
| 2010/0088305 A1* | 4/2010 | Fournier | 707/706 |
| 2010/0131636 A1* | 5/2010 | Suri et al. | 709/224 |
| 2011/0041182 A1* | 2/2011 | Stenfelt | 726/23 |

FOREIGN PATENT DOCUMENTS

| | | |
|---|---|---|
| JP | 2003501715 A | 1/2003 |
| JP | 2006244481 A | 9/2006 |
| JP | 2008177821 A | 7/2008 |

* cited by examiner

*Primary Examiner* — El Hadji Sall
(74) *Attorney, Agent, or Firm* — Sughrue Mion, PLLC

(57) ABSTRACT

To eliminate necessity of transmitting user data containing confidential information to an external network and necessity of preparing a proper environment for a user to execute an application. A web service system includes a virtualization platform on a local site side and a virtualization platform on a remote site side. The virtualization platform on the local site side includes: a network processor which separately establishes communication lines connected, respectively, to the client machine and to a network processor of the virtualization platform on the remote site side; a confidential data control section which judges whether the user data contains confidential information, and determines the destination; and a virtual machine service section which, upon receiving the judgment result indicating that the user data contains the confidential information, executes migration of the virtual machine of the virtualization platform on the remote site side to the virtualization platform on the local site side.

5 Claims, 12 Drawing Sheets

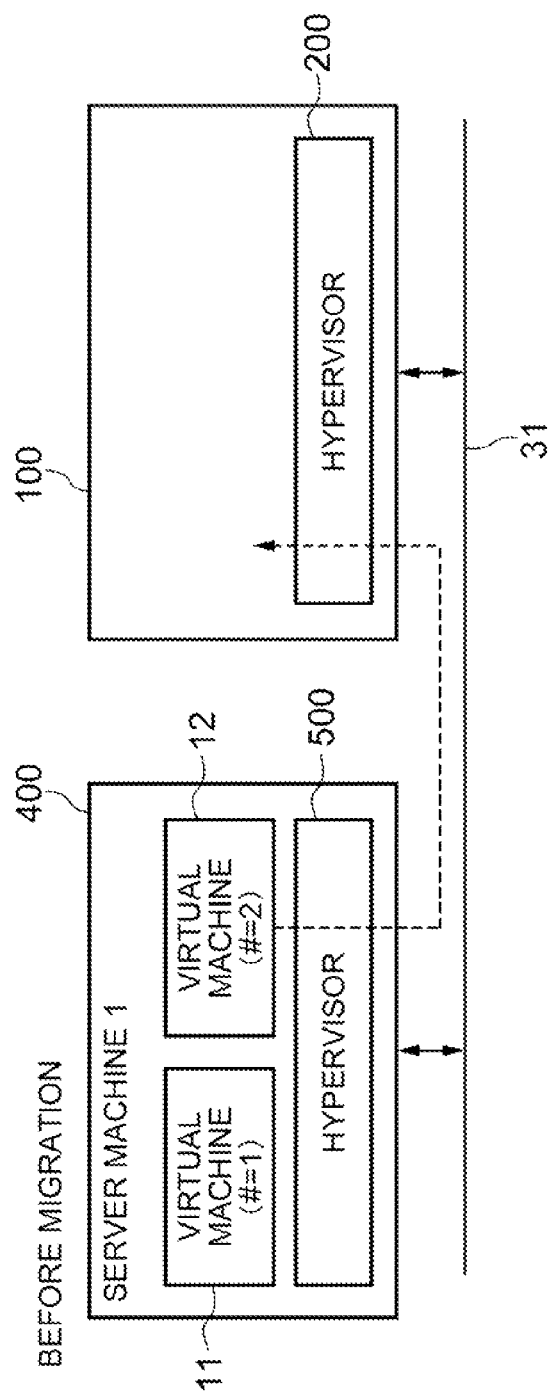
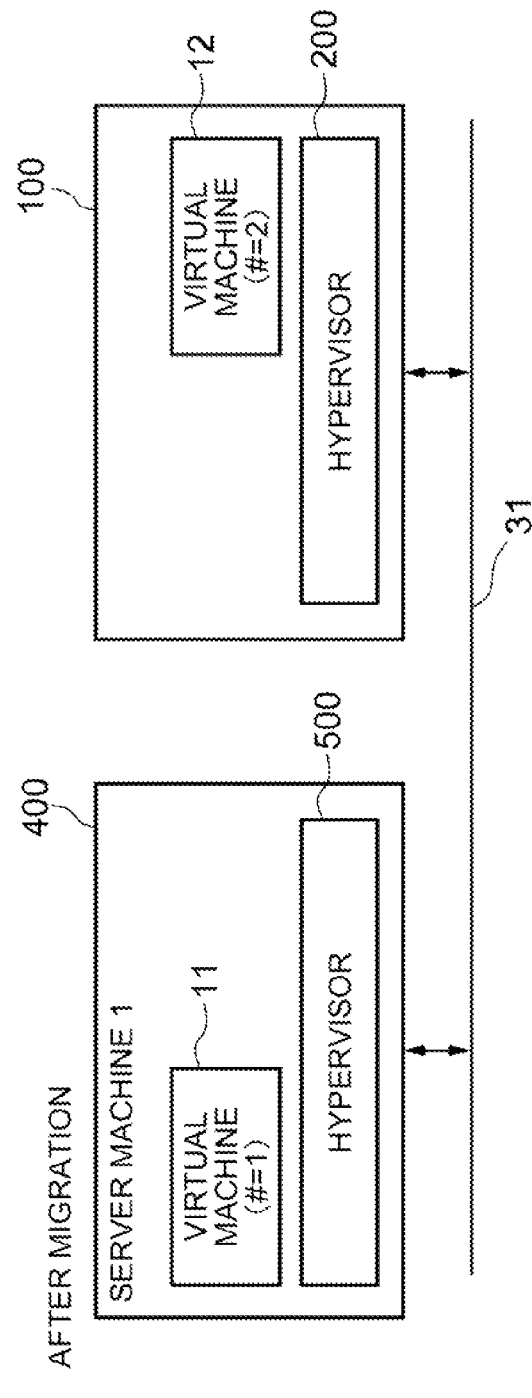
FIG. 5A
FIG. 5B

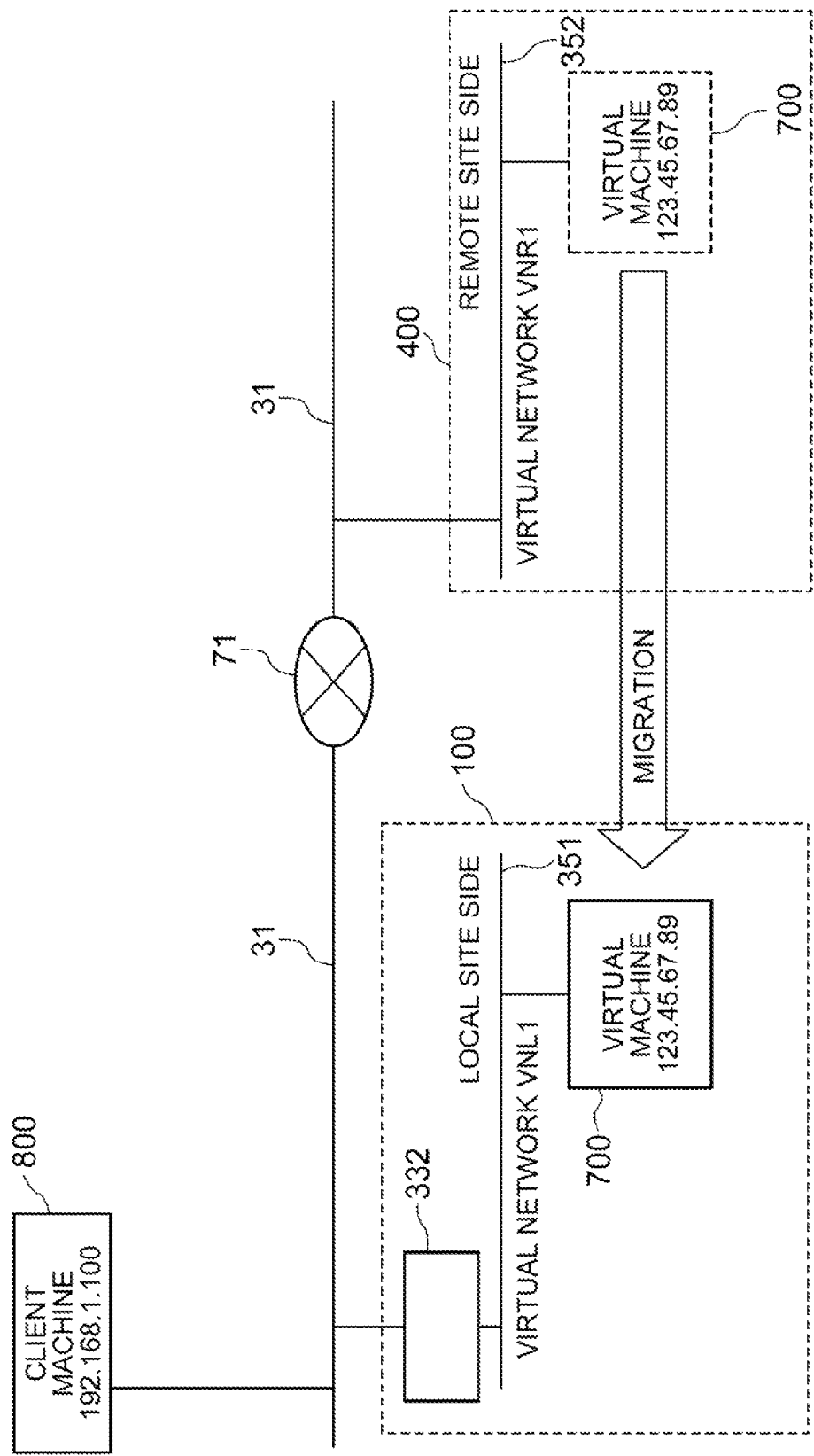

WEB SERVICE SYSTEM, WEB SERVICE METHOD, AND PROGRAM

CROSS-REFERENCE TO RELATED APPLICATION

This application is based upon and claims the benefit of priority from Japanese patent application No. 2009-067900, filed on Mar. 19, 2009, and Japanese patent application No. 2009-278713, filed on Dec. 8, 2009, the disclosure of which is incorporated herein in its entirety by reference.

BACKGROUND OF THE INVENTION

1. Field of the Invention

The present invention relates to utilization of application software of a web base from a client machine side. More specifically, the present invention relates to avoiding risks caused by having user data containing confidential information transmitted to external networks.

2. Description of the Related Art

In corporate activities, each user installs software to a client machine on a local network to process various data. In that case, each user needs to deal with various troubles generated for installing required software and for using the software. Particularly, a great number of software is required in accordance with various kinds of files and versatility of data processing methods, so that troublesome works each user needs to deal with are increased as well.

Therefore, recently, a form such as SaaS (Software As A Service) has drawn an attention in accordance with actualization of broadband network lines and advancement in web services. "SaaS" is a form which utilizes software on a remote site as a service via a web interface.

FIG. 12 shows explanatory diagrams showing a case where a user uses an application of a web base provided by SaaS from a client machine side. FIG. 12A shows a flow of actual data transmission, and FIG. 12B shows a state where the user is actually in operation. In FIG. 12, actual transmissions and receptions of a data tile and operation content information are all done via a network (Internet).

As shown in FIG. 12A, the user access to an application server (referred to as AP server hereinafter) 930 which also functions as a web server that is not on a local machine from a client machine 900 by using a web browser 910 via an Internet 920 to start an application 911a such as a word processor or a spreadsheet. User data 901 used by the user on the application soft 911a is transmitted to the AP server 930 from the client machine 900.

When the user accesses to the AP server 930 by the web browser 910 and starts the application 911a as shown in FIG. 12A, the application 911a started on the AP server 930 and the user data 901 used for the application 911a are displayed on a display 902 of the client machine 900 by the web browser 910 as shown in FIG. 12B, and a virtual state for the user to operate the application 911a on the AP server 930 on the client machine 900 is created.

The application 911a operated on the AP server 930 executes processing for the user data 901 in accordance with the operation content of the user transmitted from the web browser 910 on the client machine 900. At the same time, the operation result is displayed on the display 902 of the client machine 900 as the display content of the web browser 910 on the client machine 900.

In this manner, the user can utilize the application 911a provided by the AP server 930 via the web browser 910 without newly installing software to the client machine 900. This makes it possible to release the user from the troublesome work and time required for installation of the software to the respective client machine and for the maintenance thereof.

As documents of related techniques, there are following patent documents. Japanese Unexamined Patent Publication 2006-244481 (Patent Document 1) discloses a technique which executes migration of a virtual machine on a cluster system from a first node to a second node. Japanese Unexamined Patent Publication 2008-177821 (Patent Document 2) discloses a technique which is a system utilizing a web application operated on a remote area web server via a web browser, in which a client machine converts specific information transmitted from a user before transmitting it to the web server. Japanese Unexamined Patent Publication 2003-501715 (Patent Document 3) discloses an example of a technique which encrypts information that is transmitted to a web server from a client machine.

As described by referring to FIG. 12, when the user data is processed by utilizing the application of the web base, it is necessary to transmit the user data to the AP server. However, this user data may contain confidential information regarding the corporate activity. Particularly, under a condition where there may be possible data leakage, the AP server to be used cannot be considered a reliable server.

Even if the AP server itself is considered fully reliable, there is a risk of being tapped on the network (Internet) to be used. When transmitting the information to the AP server, normally, encrypted communication using protocol such as SSL or TSL is used. However, due to the recent improvements in the speed and performance of computers, it is undeniable that there is a risk of having the communication decoded unlawfully especially when the extent of encryption is insufficient.

For dealing with such concerns regarding information leakage caused by using the application of the web base, it simply needs in the first place to avoid transmission of the user data containing confidential information to a remote site from a local site that handles the confidential information. As one of such methods, there is a method which downloads and uses an application for processing data via a network, as disclosed in Patent Document 1. With this technique, it is true that there is no need to transmit the user data containing the confidential information to an external network.

However, with the method which downloads the application via the network, it is necessary to download the application even in a case where the user process data that does not contain confidential information. Thus, there are following issues with this method, for example. That is, a computer resource on the local site side to which the application is to be downloaded is consumed wastefully, and it is necessary to prepare a proper environment for the user to execute the application.

Among the Patent Documents, the techniques disclosed in. Patent Documents 2 and 3 transmit the data containing the confidential information from the client machine to the web server after encrypting the data. However, those are not the techniques with which the user data containing the confidential information does not have to be transmitted to the outside the local site.

SUMMARY OF THE INVENTION

It is therefore an exemplary object of the present invention to provide a web service system, a web service method, and a program thereof, with which user data containing confidential information does not have to be transmitted to a network and with which it is unnecessary to prepare a proper environment for a user to execute an application.

In order to achieve the foregoing object, the web service system according to an exemplary aspect of the invention is a web service system which processes user data provided from a client machine by using a virtual machine on a remote site side. The system includes a virtualization platform on a local site side and a virtualization platform on the remote site side linked via a communication net, wherein the virtualization platform on the local site side includes: a network processor which separately establishes a communication line connected to the client machine and a communication line connected to a network processor of the virtualization platform on the remote site side; a confidential data control section which judges whether or not the user data transmitted to the network processor on the local site side contains confidential information, and determines a destination of the user data based on a judgment result thereof; and a virtual machine service section which, upon receiving the result of judgment made by the confidential data control section indicating that the user data contains the confidential information, executes migration of the virtual machine of the virtualization platform on the remote site side to the virtualization platform on the local site side.

The web service method according to another exemplary aspect of the invention is a web service method which processes user data provided from a client machine by using a virtual machine on a remote site side in a system including a virtualization platform on a local site side and a virtualization platform on the remote site side linked via a communication net. The method includes: separately establishing a communication line connected to the client machine and a communication line connected to a network processor of the virtualization platform on the remote site side by using a network processor that is provided to the virtualization platform on the local site side; judging whether or not the user data transmitted to the network processor on the local site side contains confidential information, and determining a destination of the user data based on a judgment result thereof; upon receiving the result of judgment indicating that the user data contains the confidential information, migrating the virtual machine of the virtualization platform on the remote site side to the virtualization platform on the local site side; and processing the user data containing the confidential information on the local site side by using the migrated virtual machine.

The program according to still another exemplary aspect of the invention is a program for executing control to process user data provided from a client machine by using a virtual machine on a remote site side. The program causes a computer, which forms a virtualization platform on a local site side that is linked to a virtualization platform on the remote site side via a communication net, to execute: a function which separately establishes a communication line connected to the client machine and a communication line connected to a network processor of the virtualization platform on the remote site side; a function which judges whether or not the user data transmitted to the network processor on the local site side contains confidential information, and determines a destination of the user data based on a judgment result thereof; and a function which, upon receiving the result of judgment indicating that the user data contains the confidential information, executes migration of the virtual machine of the virtualization platform on the remote site side to the virtualization platform on the local site side.

BRIEF DESCRIPTION OF THE DRAWINGS

FIG. 5 shows a conceptual diagram showing the state where the virtual machine created on a hypervisor described in FIG. 2 is migrated onto another hypervisor, in which FIG. 5A shows the state before the migration and FIG. 5B shows the state after the migration;

FIG. 11 is an explanatory diagram showing the virtual network within the virtual machine system, when the AP server (virtual machine) is migrated to the local site side; and FIGS. 12A and 12B show explanatory diagrams showing a case where the user uses application software of a web base provided by a client machine by SaaS, in which FIG. 12A shows a flow of actual data transmission, and FIG. 12B shows a display state on a display of the client operated by the user.

DETAILED DESCRIPTION OF THE EXEMPLARY EMBODIMENT

Hereinafter, an exemplary embodiment of the invention will be described in detail by referring to the accompanying drawings.

Typically, a web proxy is located in an environment where communication to the Internet is limited by a firewall, e.g., an internal network (intranet) such as an in-house network. When a client machine included in the intranet accesses to a server or the like of an external network, the web proxy has a function of acting as a proxy to relay the access.

With secure communication which uses SSL (Secure Socket Layer) or TLS (Transport Layer Security) protocol when making communication for the client machine to an external server or the like, the web proxy simply passes through (relays) the communication without checking the encrypted data. Thereby, a session is established between the client machine and the external server or the like.

Since the web proxy transmits the encrypted data without checking the content of the data encrypted by SSL or TLS protocol to the outside, there is a possibility that the data may become decoded in the middle of communication.

The exemplary embodiment of the invention is designed to improve the fragility of the web proxy, and to create a web service system by utilizing a virtual machine system. Hereinafter, the exemplary embodiment of the invention will be described in a specific manner.

Figure 1:
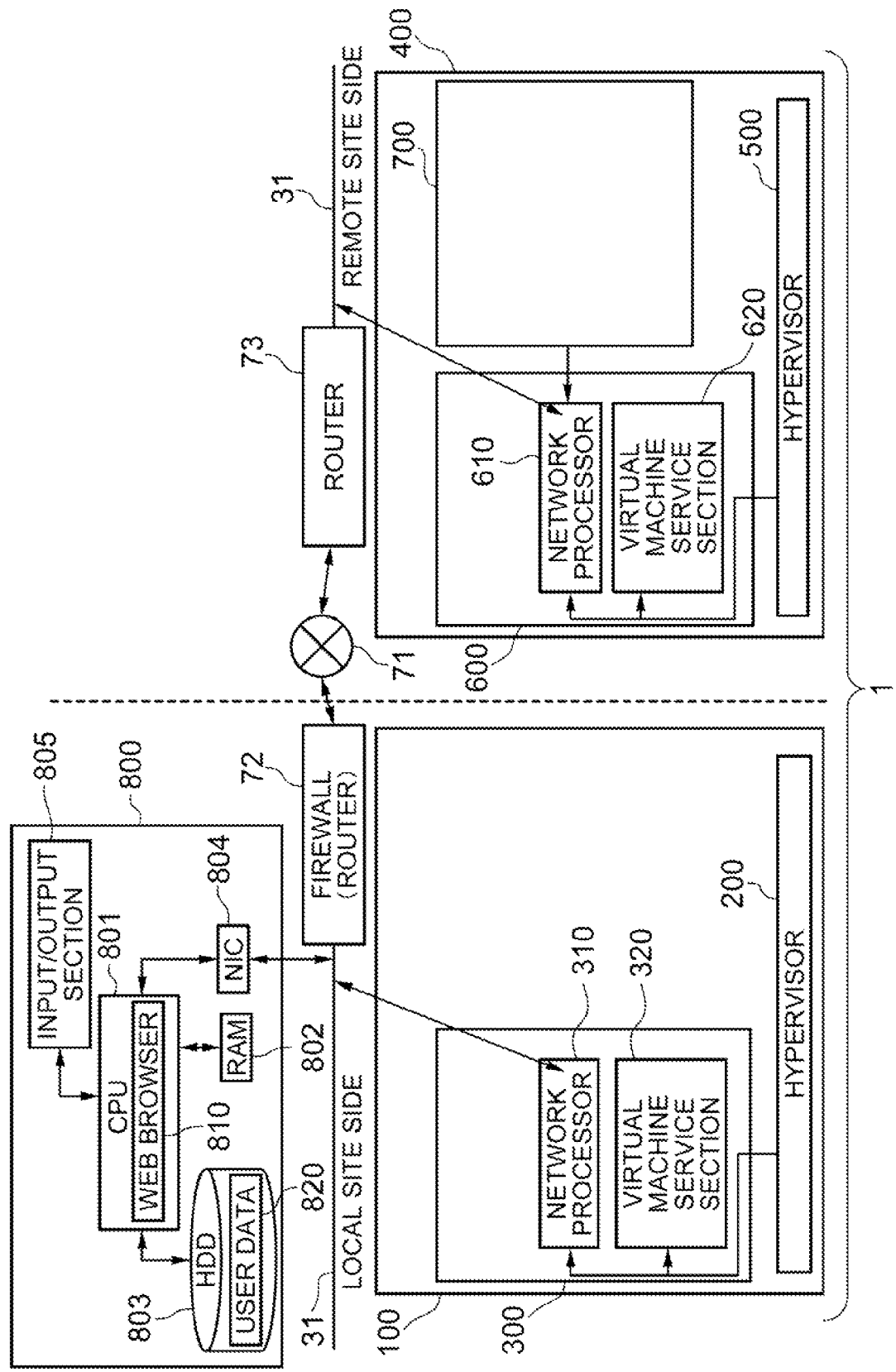
FIG. 1 is an explanatory diagram showing the structure of a web service system and a client machine according to a first exemplary embodiment of the invention.

As shown in FIG. 1, a web service system 1 according to the exemplary embodiment of the invention includes: a virtualization platform 100 located on a local site side; a virtualization platform 400 located on a remote site side; and a client machine 800 located on the local site side. The virtualization platforms 100 and 400 are linked via routers 72, 73 and an Internet 71. The virtualization platform 100 on the local site side is for the client 800 to make an access on the local site side, and a firewall function is mounted to the router 72 that is connected to the virtualization platform 100 on the local site side.

As shown in FIG. 1, the virtualization platform 100 on the local site side includes: a service virtual machine 300 which implements a virtual machine system; and a hypervisor 200. As shown in FIG. 1, the virtualization platform 400 on the remote site side includes: a service virtual machine 600 which implements a virtual machine system; and a hypervisor 500. Further, as shown in FIG. 1, the virtualization platform 400 on the remote site side includes an AP server (virtual machine) 700 to be migrated in response to a request made by the virtualization platform 100 when data provided by the client 800 contains confidential information. The AP server 700 is a virtual machine that is provided with a web service function for executing an application for processing user data provided by the client machine 800.

The virtualization platform 100 on the local site side and the virtualization platform 400 on the remote site side used in the exemplary embodiment of the invention will be described by referring to FIG. 1-FIG. 5.

Figure 2:
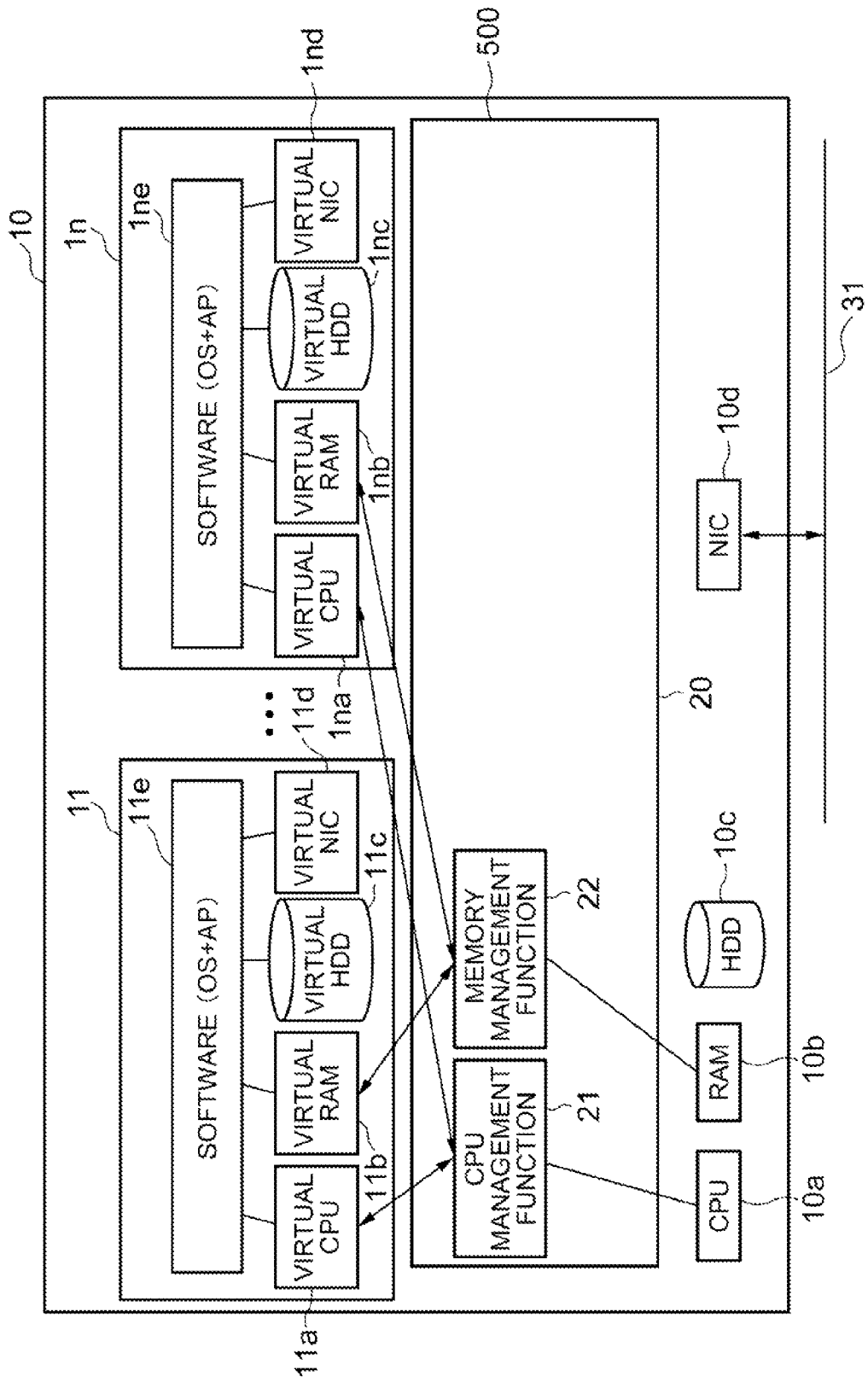
FIG. 2 is an explanatory diagram showing the concept of a virtual machine system which virtually implements a calculator platform that is used in the exemplary embodiment.

As shown in FIG. 2, the virtualization platform 100 on the local site side and the virtualization platform 400 on the remote site side are virtually created on physical calculators. Hereinafter, the virtual machine (AP server 700) for processing the user data provided by the client machine 800 will specifically be described. The virtual machine described by referring to FIG. 2 corresponds to the virtually created AP server 700 shown in FIG. 1. While FIG. 1 illustrates only one AP server 700, there are more than one virtual machines which correspond to the AP server 700. Various kinds of applications for processing the user data may be installed to a single virtual machine or may be installed to two or more virtual machines in a dispersing manner.

The calculator includes physical computer resources such as a physical CPU (Central Processing Unit), a physical RAM (Random Access Memory), a physical HDD (Hard Disk Drive), and a physical NIC (Network Interface Card), and it is structured to execute software that is a combination of an OS (Operating System) and an application. The virtualization platform 100 on the local site side and the virtualization platform 400 on the remote site side are created by using the physical calculators described above.

The virtualization platform 100 on the local site side and the virtualization platform 400 on the remote site side are different in regards to the fact whether the virtual machines thereof are migrated or not, but the other structures are the same. Thus, the virtualization platform 400 on the remote site side will be described herein by referring to FIG. 1 and FIG. 2.

As shown in FIG. 2, a physical calculator 10 includes computer resources such as a CPU 10a, a RAM 10b, and an HDD 10c. As shown in FIG. 1 and FIG. 2, a hypervisor 500 which is software or firmware for implementing the physical environment of the calculator as the virtual machine is mounted to the calculator 10. The hypervisor 500 may also be called a VMM (Virtual Machine Manager) or a virtual machine monitor in some cases.

The hypervisor 500 allots the computer resources on the calculator 10 such as the CPU 10a, the RAM 10b, and the HDD 10c to the virtual machines by a time division method or a space division method. In the explanations below, a case of using two or more virtual machines 1# (1 to n) as the virtual machines will be described. However, the number of the virtual machines is not limited to that.

Specifically, as shown in FIG. 2, the hypervisor 500 allots the physical computer resources to the 1st to n-th virtual machines 1#(#=1 to n). At the same time, the hypervisor 500 allots the virtual computer resources such as a virtual CPU (Central Processor) 11(#=1)a, a virtual RAM (Random Access Memory) 11(#=1)b, a virtual HDD (Hard Disk Drive) 11(#=1)c, and a virtual NIC (Network Interface Card) 11(#=1)d to the virtual machine that is allotted as the 1st virtual machine, and also allots the virtual computer resources such as a virtual CPU (Central Processing Unit), a virtual RAM (Random Access Memory), a virtual HDD (Hard Disk Drive), and a virtual NIC (Network Interface Card) to the virtual machines thereafter.

FIG. 2 illustrates the 1st virtual machine 11 (#=1) and the n-th virtual machine 1n (#=n).

FIG. 2 shows a state where the virtual computer resources such as the virtual CPU (Central Processing Unit) 11(#=1)a, the virtual RAM (Random Access Memory) 11(#=1)b, the virtual HDD (Hard Disk Drive) 11(#=1)c, and the virtual NIC (Network Interface Card) 11(#=1)d are allotted to the 1st virtual machine 11 (#=1), and the virtual computer resources such as the virtual CPU (Central Processing Unit) 11(#=n)a, the virtual RAM (Random Access Memory) 11(#=n)b, the virtual HDD (Hard Disk Drive) 11(#=n)c, and the virtual NIC (Network Interface Card) 11(#=n)d are allotted to the n-th virtual machine 1n (#=n). The virtual computer resources such as a virtual CPU (Central Processing Unit), a virtual RAM (Random Access Memory), a virtual HDD (Hard Disk Drive), and a virtual. NIC (Network Interface Card) are also allotted to the virtual machines from the 2nd virtual machine that is the next machine of the 1st virtual machine to the (n−1)-th machine, not shown, by the hypervisor 500.

As described above, the hypervisor 500 virtually creates one or more virtual machines 1#(#=1 to n). At the same time, the hypervisor 500 executes a CPU management function 21 for allotting the virtual CPUs 11 (#=1)a-1n (#=n)a to the virtualized virtual machines 11 (#=1)b-1n (#=n) and a memory management function 22 for allotting the virtual RAMs 11 (#=1)b-1n (#=n)b to the virtualized virtual machines 11 (#=1)-1n (#=n).

The virtual machine 1# (#=1 to n) that is virtually created by the hypervisor 500 executes each of the OS and the application 1# (#=1 to n)e individually under control of the hypervisor 500. The application 1# (#=1 to n)e corresponds to the application used by the user to process the user data by operating the client machine 800.

Figure 3:
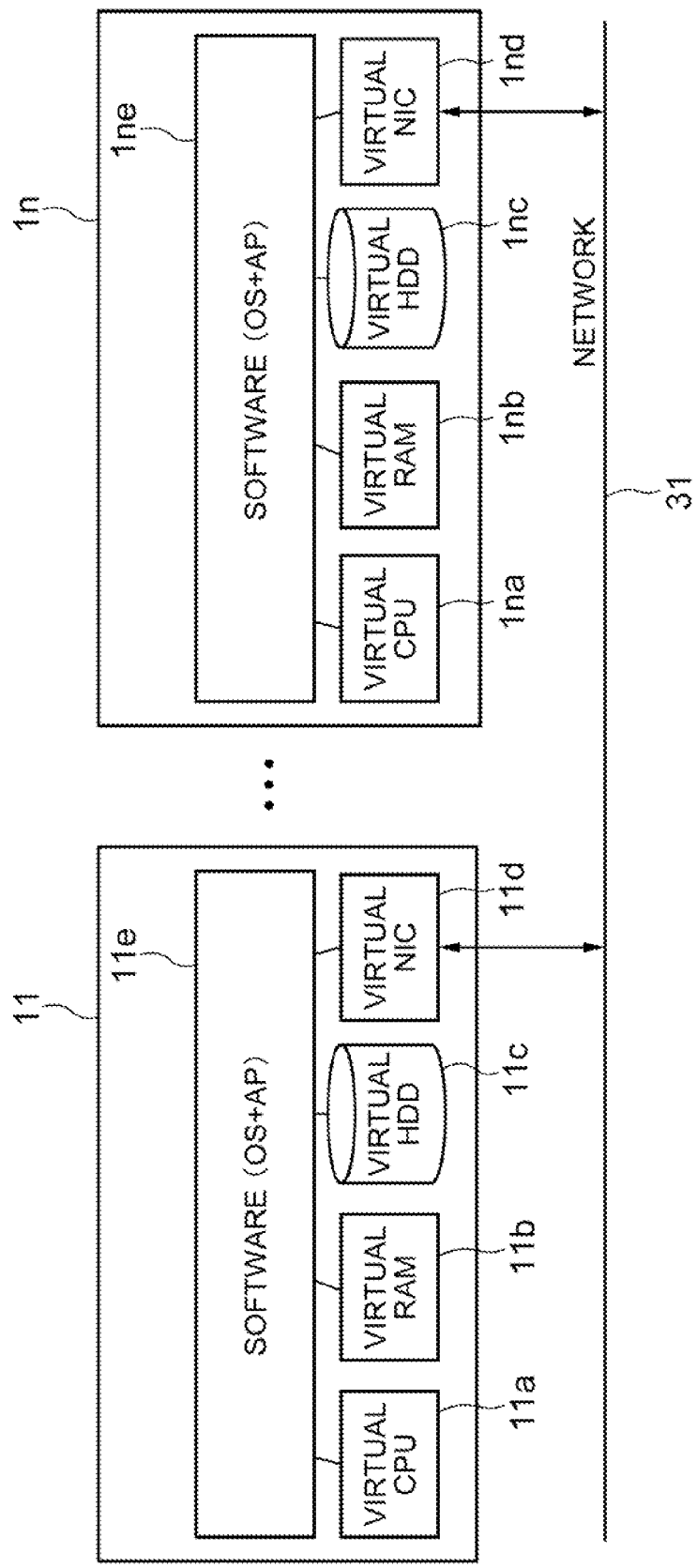
FIG. 3 is an explanatory diagram showing a state on the appearance of each virtual machine from outside a server machine via a network.

When one or more virtual machines 1# (#=1 to n) shown in FIG. 2 are viewed from a network 31 side of the remote site, the state of the one or more virtual machines 11-1n on the appearance has no difference at all from that of the physical computer as shown in FIG. 3. The explanations above are made in regards to the virtual machine (AP server 700) in the virtualization platform 400 on the remote site side. However, the hypervisor 200 of the virtualization platform 100 on the local site side also functions in the same manner as that of the hypervisor 500 on the remote site side to virtually create one or more virtual machines 1# (#=1 to n) shown in FIG. 2 in the virtualization platform 100 on the local site side. FIG. 1 shows the state before executing migration of the virtual machine (AP server 700) on the remote site side.

Figure 4:
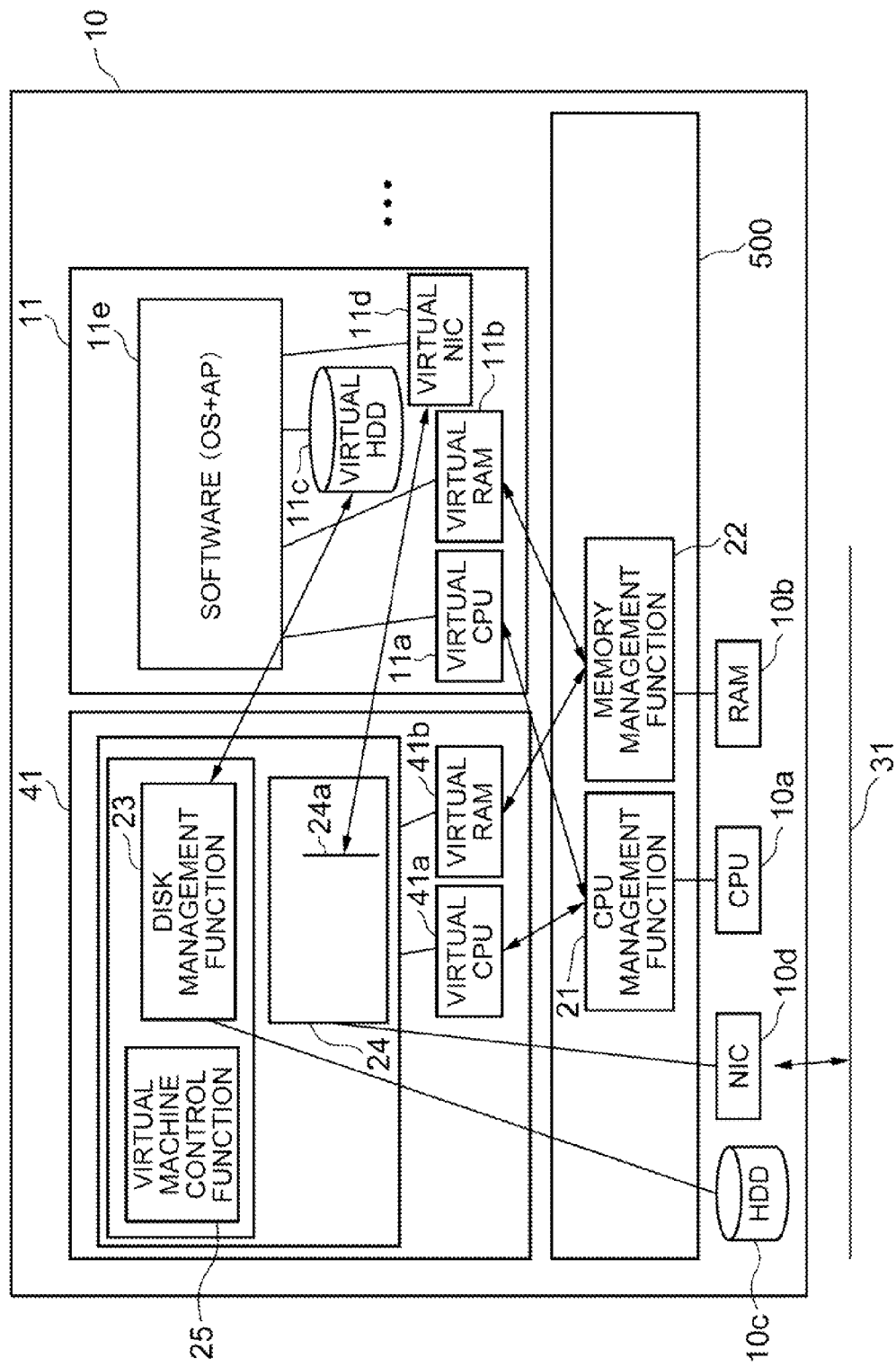
FIG. 4 is an explanatory diagram showing the concept of the virtual machine system which includes a service virtual machine.

In the above, the virtual machine (AP server 700) for processing the user data provided by the client machine 800 is described specifically. However, as shown in FIG. 1, a service virtual machine 600 is created in the virtualization platform 400 on the remote site side. Next, the service virtual machine 600 will be described by referring to FIG. 4. In FIG. 4, the service virtual machine 600 shown in FIG. 1 is illustrated as a service virtual machine 41.

As shown in FIG. 4, the hypervisor 500 allots the computer resources of the physical calculator 10 such as the CPU 10a, the RAM 10b, and the HDD 10c to the service virtual machine 41 by time division or space division. Specifically, as shown in FIG. 4, the hypervisor 500 allots the physical computer resources to the service virtual machine 41. At the same time, the hypervisor 500 allots the virtual computer resources such as a virtual CPU (Central Processing Unit) 41a and a virtual RAM (Random Access Memory) 41b to the service virtual machine 41. Allotment of the virtual computer resources described above is done by the hypervisor 500 through executing the CPU management function 21 and the memory management function 22.

Further, as shown in FIG. 4, the hypervisor 500 executes: a disk management function 23 which allots the virtual HDDs 11(#=1)c-1n (#=n)c to the virtualized virtual machines 11 (#=1)-1n (#=n) and the service virtual machine 41; a network management function 24 which allots the virtual NICs 11 (#=1)d-1n (#=n)d to the virtual machines 1#(#=1 to n), creates a virtual network 24a, and manages connection of the virtual NICs to a physical network 31 via the virtual network 24a and the physical NIC 10d; and a virtual machine control function 25 which implements services such as migration of the virtual machine in cooperation with management interfaces between the virtual machines and other sections which form the virtual machines. The virtual machine control function 25 includes various kinds of functions for executing managements required for operating the virtual machines. The virtual machine control function 25 may also be executed by a virtual machine service section 620 (320).

The network management function 24 corresponds to a network processor 610 shown in FIG. 1. In FIG. 1, the disk management function 23 is created as a disk control section that is a separate section from the virtual machine service section 620 shown in FIG. 1. The disk control section is not a specific feature of the present invention, so that an illustration thereof is omitted in FIG. 1.

When there are two or more virtual machines, the hypervisor 500 may be created in common to those virtual machines and the virtual network 24a or may be created exclusively for each of the two or more virtual machines.

Next, migration executed when the user data provided by the client machine 800 is the data containing confidential information will be described by referring to FIG. 1 and FIG. 5. As shown in FIG. 1 and FIG. 5A, it is assumed to be under an occasion where the user data containing the confidential information is to be processed by the virtual machine 12 while the virtual machine 12, for example, is operating on the virtualization platform 400 on the remote site side.

Under the occasion where the user data containing the confidential information is to be processed by the virtual machine 12, when the network processor 310 on the local site side to be described later detects that the user data contains the confidential information and outputs a detection signal thereof to the virtual machine service section 320 on the local site side, the virtual machine service section 320 notifies the network processor 610 on the remote site side via the network processor 310 and the internet 71 that it is necessary to perform migration.

The network processor 610 on the remote site side which has received the notification transmits the notification to the virtual machine service section 620 on the remote site side.

Upon receiving the notification, the virtual machine service section 620 transmits information regarding the operation state of the virtual machine 12 that is currently in operation to the virtual machine service section 320 on the local site side via the network processor 610 on the remote site side and the network processor 310 on the local site side.

Upon receiving the information regarding the operation state of the virtual machine 12 operating on the remote site side from the virtual machine service section 620, the virtual machine service section 320 on the local site side gives that information to the hypervisor 200 on the local site side in cooperation with the virtual machine service section 620 on the remote site side.

Upon receiving that information, the hypervisor 200 on the local site side works to execute migration of the operation state of the virtual machine 12 on the remote site side to the virtual machine 12 on the local site side based on that information as shown in FIG. 5B. With this migration, the virtual machine 12 operating on the virtualization platform 400 on the remote site side is created on the virtualization platform 100 on the local site side.

This migration makes it possible to process the user data containing confidential information provided by the client machine 800 on the virtual machine 12 on the local site side instead of processing it on the virtual machine 12 on the remote site side.

In the virtual machine system including the service virtual machine 41, the functions related to I/O devices such as the HDD and the network are usually transferred to the service virtual machine 41. The purposes of using the service virtual machine 41 are to reduce the load imposed upon developments of hypervisors by reutilizing existing software, to prevent the hypervisor from becoming too massive as software, to increase the security, etc.

Further, while the hypervisors 200, 500 are used as the virtual machine management sections 200, 500 for controlling the operations of the virtual machines and the service virtual machines on the virtualization platforms 100, 400, it is also possible to use structures other than the hypervisors 200, 500. For example, the virtual machine management sections 200, 500 may be created by using a part of the OS functions or an application instead of using the hypervisors 200, 500.

It is also possible to omit the service virtual machine 41, and let the hypervisors 500 (200) execute the functions of the service virtual machine 41.

Next, the network processor 310 and the virtual machine service section 320 on the local site side will be described by referring to FIG. 1, FIG. 6, and FIG. 7.

As shown in FIG. 1, the client machine 800 which makes access to the virtualization platform 100 on the local site side is placed on the local site side. The client machine 800 is a typical computer device, a portable telephone, a PDA (Personal Digital Assistant), or the like, and includes physical computer resources such as a CPU 801, a RAM 802, an HDD 803, and an NIC 804, as in the case of the virtualization platform 100. Further, the client machine 800 includes an input/output section 805 which accepts operations by the user and presents the operation results to the user. The client machine 800 accesses to the virtualization platform 100 on the local site side via the network 31 within the local site.

The web browser 810 of the client machine 800 is a program operated on the CPU 801, which displays data transmitted from the virtual machine (AP server 700) on the remote site side or the virtual machine (AP server 700)

migrated to the virtualization platform 100 on the local site side from the virtualization platform 400 on the remote site side as web contents. The web browser 810 works by operations from the input/output section 805, and displays the operation results on the input/output section 805. The HDD 803 stores the user data 820 which is a data file handled by the virtual machine (AP server 700) on the remote site side or the virtual machine (AP server 700) which is migrated to the virtualization platform 100 on the local site side from the virtualization platform 400 on the remote site side. The structure of the user data 820 will be described later. Further, there are also cases where the user data 820 is stored in a section other than the HDD 803.

Many devices other than the CPU, RAM, HDD, NIC, and input/output device are used for the computers which virtually create the virtualization platforms 100, 400 and the computers which virtually create the client machines 800. However, only the devices that are required especially for describing the exemplary embodiments of the invention are mentioned in this specification.

Figure 6:
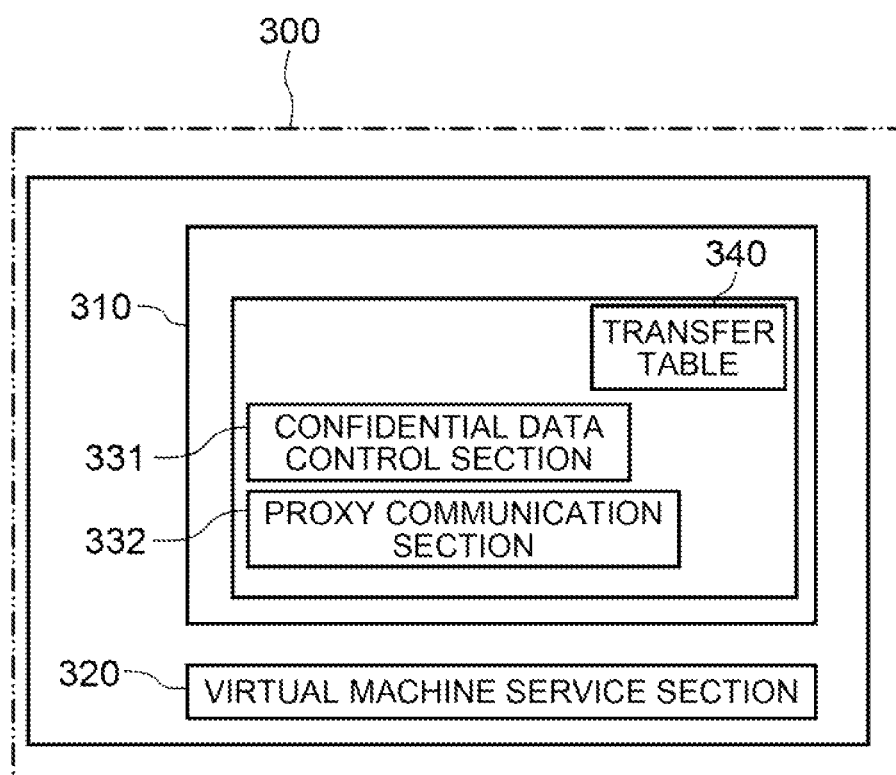
FIG. 6 is an explanatory diagram showing an internal structure of the service virtual machine of the local site side shown in FIG. 1.

The virtual machine service section 320 on the local site side shown in FIG. 6 is in a same structure as that of the virtual machine service section 41 shown in FIG. 4 (corresponds to the virtual machine service section 620 on the remote site side shown in FIG. 1).

The network processor 310 on the local site side according to the exemplary embodiment of the invention is in a different structure from that of the network processor 610 on the remote site side. This will be described in a specific manner hereinafter.

As shown in FIG. 6, the network processor 310 provided to the service virtual machine 300 on the local site side according to the exemplary embodiment of the invention includes a confidential data control section 331, a proxy communication section 332, and a transfer table 340. The transfer table 340 is stored in a memory of the calculator which forms the virtualization platform 100 on the local site side.

The network processor 310 has a multipurpose web proxy function. At the same time, as shown in FIG. 7, the network processor 310 has a function of establishing a communication line 81 connected to the client machine 800 and establishing a communication line 82 connected to the network processor 610 of the virtualization platform 600 on the remote site side individually. Specifically, the network processor 310 establishes the first SSL communication line 81 connected to the client machine 800 and establishes the second SSL communication line 82 connected to the network processor 610 of the virtualization platform 600 on the remote site side by using an SSL (Secure Sockets Layer) or TLS (Transport Layer Security) protocol. The network processor 310 separately establishes the first SSL communication line 81 and the second SSL communication line 82, e.g., establishes the second SSL communication line 82 after establishing the first SSL communication line 81 with a time difference provided therebetween.

Therefore, the network processor 310 does not pass through the encrypted data to the virtualization platform 400 on the remote site side from the client machine 800 even when it receives the user data encrypted by using the SSL or TLS protocol provided by the client machine 800.

The function of the multipurpose web proxy means a function which judges only the kind of data encrypted by using the SSL or TLS protocol, for example, and only the kind of HTML data, and acts as proxy to make access to the virtualization platform 400 on the remote site side from the client machine 800 when the data is HTML data without checking the contents of the data.

The transfer table 340 stores address information of the client machine that is the sender of the user data, an identifier for identifying the virtual network 24a to which the virtual machine (AP server 700) of the virtualization platform 400 on the remote site side belongs, and an identifier for identifying the virtual network 24a to which the virtual machine (AP server 700) migrated to the local site side from the remote site side belongs in a corresponding manner. The stored data of the transfer table 340 is rewritten as necessary by a confidential data control section 331 to be described later. The data structure will be described later.

The confidential data control section 331 receives the user data from the client machine 800 held by the network processor 310 by cutting the pass-through communication line through separately establishing the first SSL communication line 81 connected to the client machine 800 and the second SSL communication line connected to the network processor 610 on the remote site side by the network processor 310, judges whether or not the user data contains confidential information, and determines the destination of the user data. Based on the judgment result, the confidential data control section 331 determines the destination of the user data as the virtual machine (AP server 700) which is migrated to the virtualization platform 100 on the local site side when it is judged that the user data contains the confidential information. The confidential data control section 331 determines the destination of the user data as the network processor 610 on the remote site side when it is judged that the user data does not contain the confidential information.

Attribute information showing whether or not the data contains confidential information is attached to the user data provided by the client machine 800. Thus, the confidential data control section 331 extracts the attribution information from the user data, and judges whether or not the confidential information is contained in the user data based on the attribute information.

The proxy communication section 332 transmits the user data to the destination of the user data determined by the confidential data control section 331. Specifically, the proxy communication section 332 transmits the user data to the virtual machine (AP server 700) which is migrated to the virtualization platform 100 on the local site side, when the confidential data control section 331 determines the destination based on the fact that the user data contains the confidential information.

Figure 8:
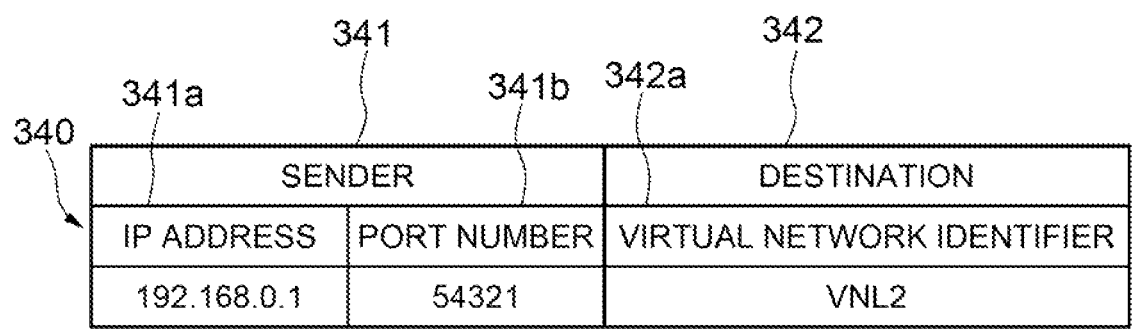
FIG. 8 is an explanatory diagram showing the structure of data stored in the transfer table shown in FIG. 6.

FIG. 8 is an explanatory diagram showing the structure of the data stored in the transfer table 340 shown in FIG. 6. The transfer table 340 is a table which shows whether or not the AP server (virtual machine) 700 which is communicating with the web browser 810 that operates on the client machine 800 is migrated to the virtualization platform 100 on the local site side from the virtualization platform 400 on the remote site side. The transfer table 340 is the data created on a RAM of the computer which forms the virtualization platform on the local site side.

In the case where the virtual machine (AP server) 700 on the virtualization platform 400 on the remote site side is migrated to the virtualization platform 100 on the local site side, the confidential data control section 331 registers, to the transfer table 340, a set of an IP address 341a of the sender of the user data (client machine 800) and a port number 341b of the client machine 800, and also a virtual network identifier 342a for making access to the destination (the AP server (virtual machine) 700 which is migrated to the virtualization platform 100 on the local site side).

Therefore, the proxy communication section 332 of the network processor 310 on the local site side transfers the user data to the virtual machine (AP server 700) which is migrated to the virtualization platform 100 on the local site side based on the destination information stored in the transfer table 340. Accordingly, only one destination of the user data is stored as the destination information stored in the transfer table 340, and there is no way that two or more destinations are stored for a single piece of user data.

In a case where the AP server (virtual machine) 700 is not migrated to the virtualization platform 100 on the local site side, there is no data stored in the transfer table 340 for transferring the user data to the virtual machine (AP server 700) which is migrated to the virtualization platform 100 on the local site side. In that case, the proxy communication section 332 decrypts transmission information contained in the user data, and transfers the data to the virtualization platform 400 on the remote site side.

The virtual network identifier 342*a* is for identifying the virtual network 24*a* which is virtually created for making access to the AP server (virtual machine) 700 which is migrated to the virtualization platform 100 on the local site side.

Figure 7:
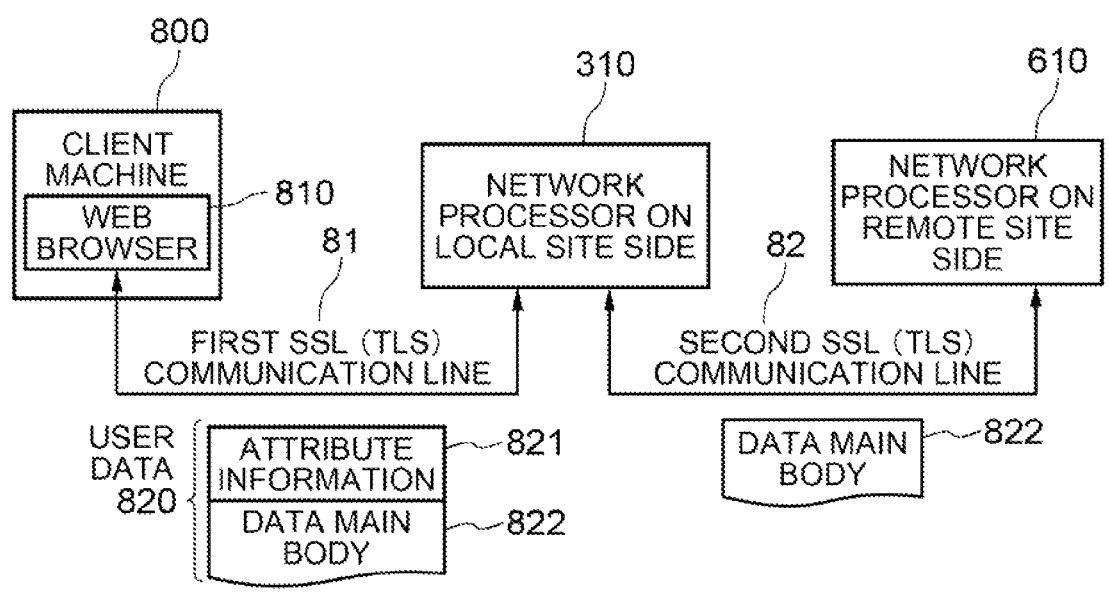
FIG. 7 is an explanatory diagram showing the data structure of a transfer table shown in FIG. 6.

As shown in FIG. 7, the user data 820 as a data file used in the exemplary embodiment is configured with attribute information 821 which shows whether the data is "public" or "confidential" and a data main body 822. When the data main body 822 of the user data 820 contains the confidential information, the attribute information 821 indicates "confidential". When the data main body 822 of the user data 820 does not contain the confidential information, the attribute information 821 indicates "public".

The confidential data control section 331 of the network processor 310 on the local site side determines the actions thereafter according to the attribute information 821.

The attribute information 821 is given to each of the user data 820 in advance. In the case shown in FIG. 7, the attribute information 821 is added to the head part of the data main body 822. However, it is not essential to be added in that manner. The means, method, and timing for adding and editing the attribute information 821 are not particularly considered the issues in this exemplary embodiment.

The proxy communication section 332 of the network processing section 310 on the local site side transfers only the data main body 882 by eliminating the attribute information 821 contained in the user data 820, when acting as proxy and relaying the communication between the web browser 810 of the client machine 800 and the AP service 710 (virtual machine) of the virtualization platform 400 on the remote site side.

Figure 9:
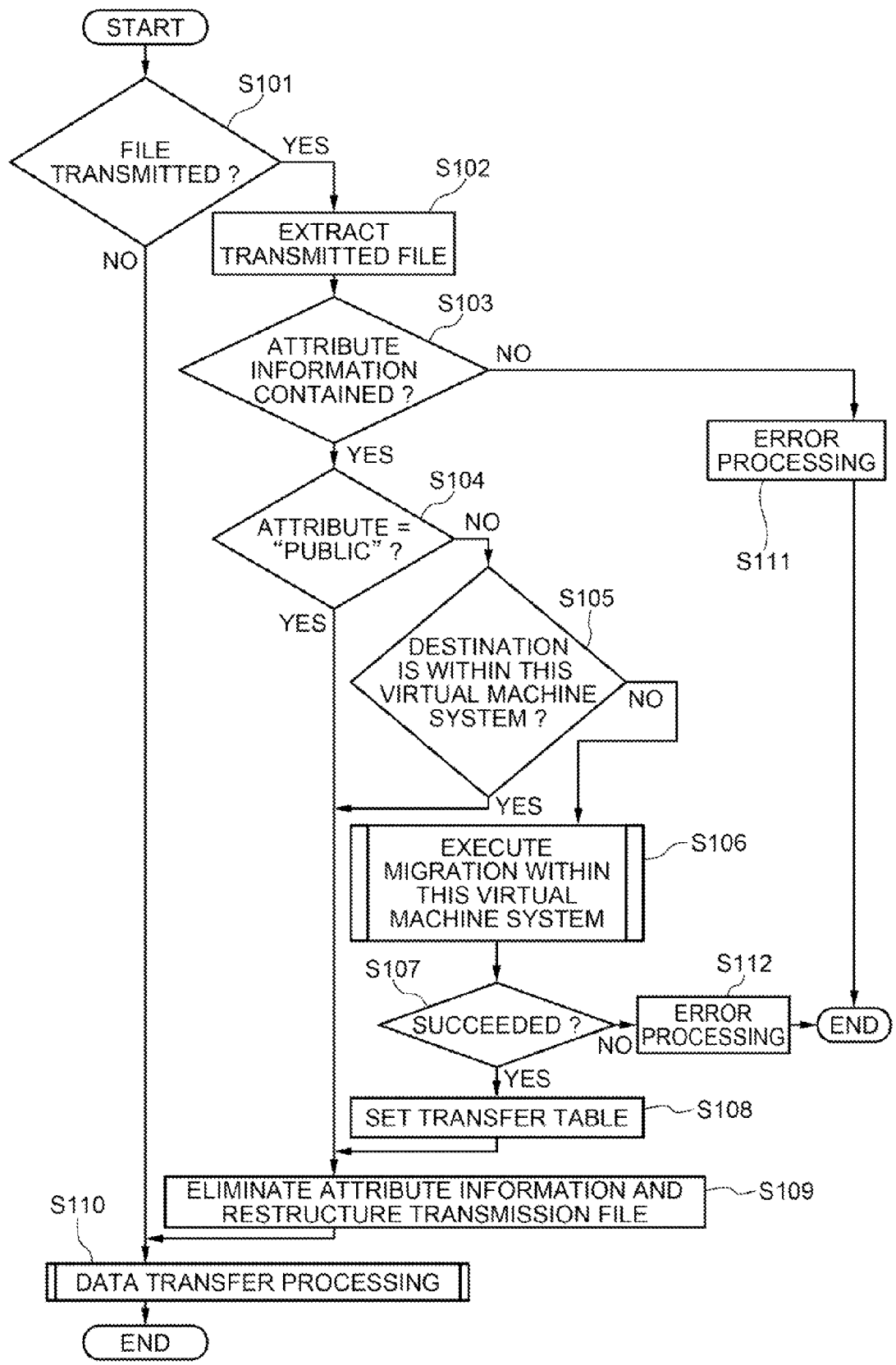
FIG. 9 is a flowchart showing actions executed by a confidential data control section when a web proxy relays communication from the client machine to the AP server.

FIG. 9 is a flowchart showing actions executed by the confidential data control section 331, when the network processor 310 on the local site side relays the communication from the web browser 810 to the AP service 710.

The confidential data control section 331 judges whether or not the data file is contained in the communication data from the web browser 810 of the client machine 800 which has made access to the virtualization platform 100 via the network 31 within the local site, i.e., the confidential data control section 331 judges whether it is a transmission of the user data 820 (step S101). When judged that it is not a transmission of the user data 820, the data control section 331 advances the processing to step S110 that is described later.

When judged that it is a transmission of the user data, the confidential data control section 331 fetches the user data 820 from the communication data (step S102), and judges whether or not the user data 820 that is the fetched file contains the attribute information 821 (step S103). When judged that the attribute information 821 is not contained in the user data, the confidential data control section 331 executes error processing (step S111) which is the processing to return an error message indicating "classification of data is unknown" to the web browser 810, and ends the processing.

Following step S103, when judged that the attribute information 821 is contained in the user data, the confidential data control section 331 judges whether the content of the attribute information 821 contained in the user data 820 is "confidential" or "public" (step S104). The confidential data control section 331 advances the processing to step S109 that is described later, when the attribute information 821 is judged as "public".

When the content of the attribute information 821 is judged as "confidential", the confidential data control section 331 determines the destination of the user data 820 to the virtual machine (AP server 700) which is migrated to the virtualization platform 100 on the local site side from the virtualization platform 400 on the remote site side based on the judgment result (step S 105).

When determining the destination of the user data 820, the confidential data control section 331 determines the destination by referring to the content of the transfer table 340 so as to refer to a set of the IP address 341*a* of the sender (client machine 800) and the port number 341*b* as well as the virtual network identifier 342 linked to the virtual machine (AP server 700) which is migrated to the virtualization platform 100 on the local site side.

When the attribute information 821 of the user data is judged as "confidential", the confidential data control section 331 makes a request to the virtual machine service section 320 on the local site side to execute migration of the AP server (virtual machine) 700 to the local site side. Upon receiving the request, the virtual machine service section 320 executes migration of the AP server (virtual machine) 700 of the virtualization platform 400 on the remote site side to the virtualization platform 100 on the local site side in cooperation with the virtual machine server 620 on the remote site side (step S106).

The confidential data control section 331 judges whether or not the migration processing executed by the virtual machine service section 320 is succeeded (step S107). When judged that it is succeeded, the confidential data control section 331 registers the IP address 341*a* and the port number 341*b* of the destination to the transfer table 340 (step S108). Then, the confidential data control section 331 determines the communication partner as the AP server 700 (virtual machine) which is migrated to the platform 100 on the local site side based on the IP address 341*a* and the port number 341*b* of the web browser 810.

Through executing the judgments and processing described above, the confidential data control section 331 eliminates the attribute information 821 from the user data 820 to reconstruct the data to the data main body 822 alone (step S109). Then, the confidential data control section 331 has the proxy communication section 332 transfer the communication data (step S110). At this time, if the entries of the IP address 341*a* and the port number 341*b* of the web browser 810 are registered to the transfer table 340, the destination of the data main body 822 is the AP server (virtual machine) 700 which is migrated to the platform 100 on the local site side. If those are not registered to the transfer table 340, the destination is remote site side.

Figure 10A:
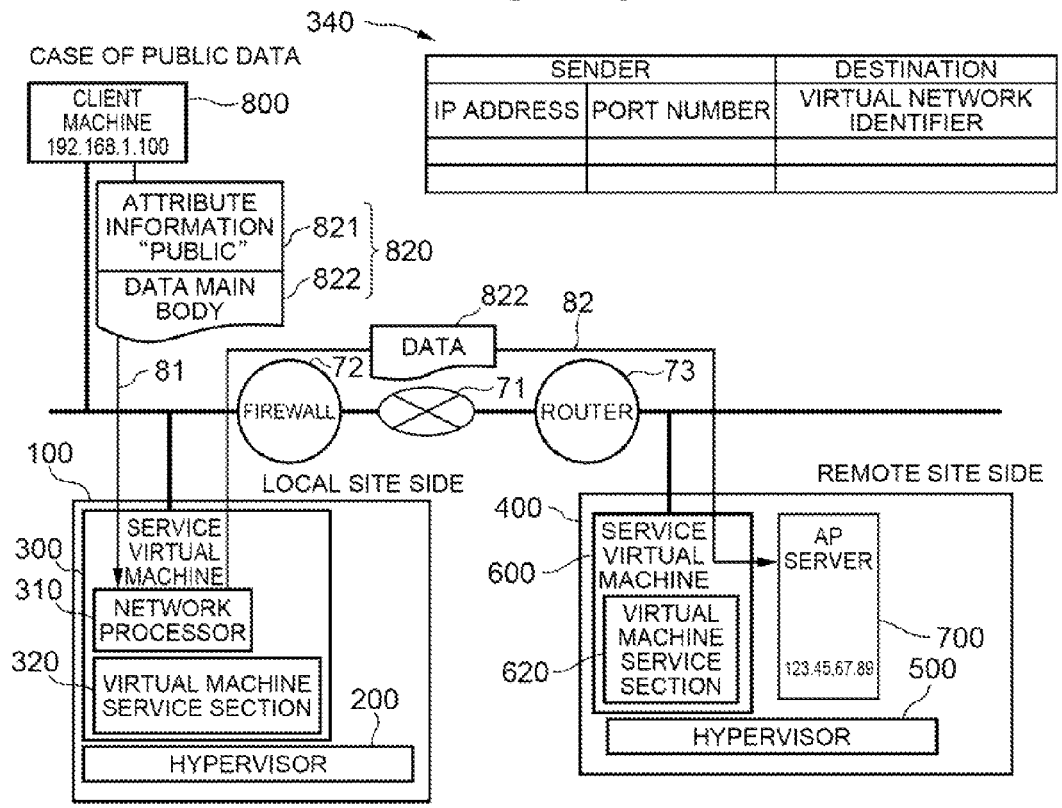
FIG. 10A is an explanatory diagram for describing a processing state of user data in a case where attribute information of the user data is "public"
Figure 10B:
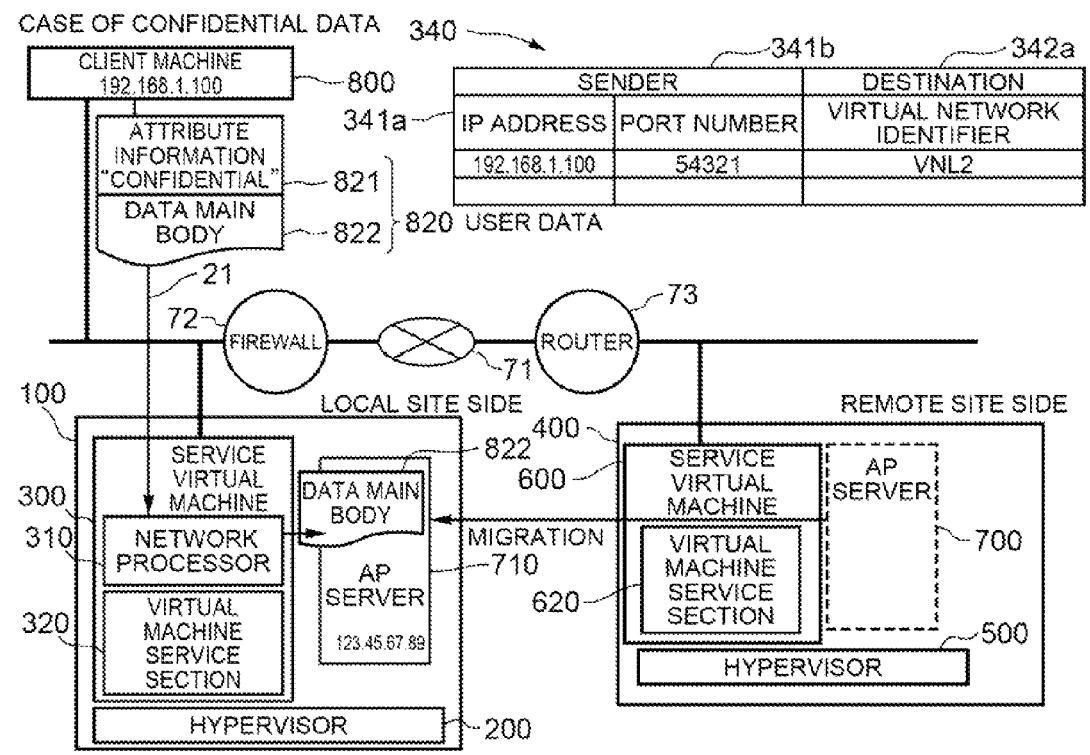
FIG. 10B is an explanatory diagram for describing a processing state of user data in a case where attribute information of the user data is "confidential"
Figure 12A:
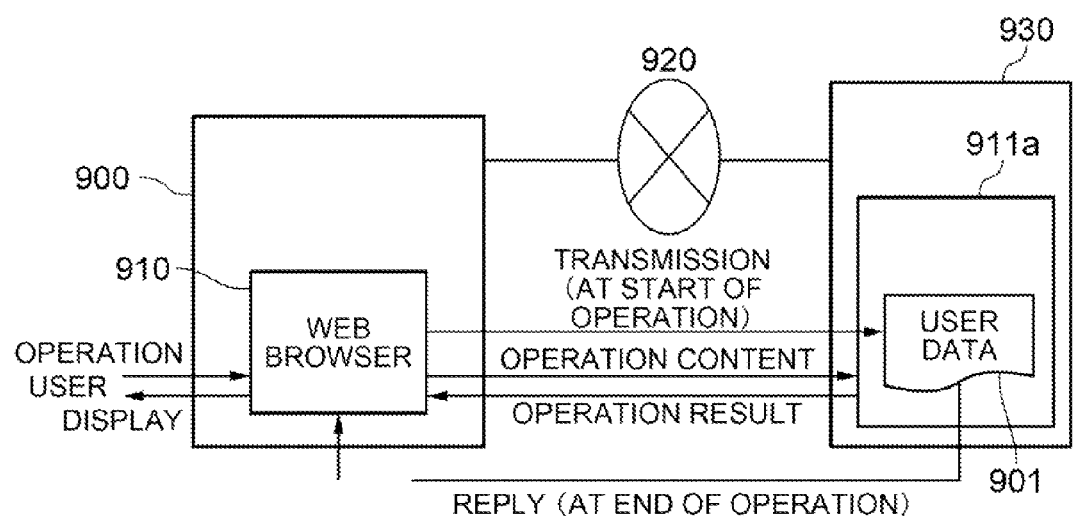
Figure 12B:
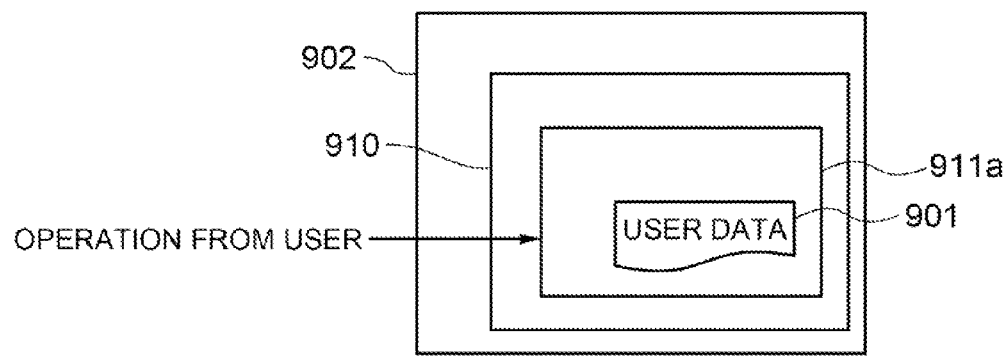

FIG. 10 shows explanatory diagrams of an operation example of communication made from the web browser 810 of the client machine 800 shown in FIG. 9 to the AP server (virtual machine) 700. FIG. 10A shows a case where the attribute information 821 of the user data 820 is "public", and FIG. 10B shows a case where the attribute information 821 is "confidential". In FIG. 10, only the functional sections which are necessary for explaining actions of each of the virtualization platforms 100 and 400 on the local site side and the remote site side, respectively, are illustrated, and the structures described in FIG. 1-FIG. 5 are omitted except for those that are considered necessary in particular for the explanations.

When the attribute information 821 of the user data 820 is "public" as shown in FIG. 10A, the confidential data control section 331 of the network processor 310 on the local site side determines the destination of the user data 820 as the network processor 610 of the virtualization platform 400 on the remote site side. Then, the confidential data control section 331 eliminates the attribute information 821 from the user data 820, and transmits the user data 820 to the proxy communication section 332. The proxy communication section 332 transmits the user data 820 to the network processor 610 on the remote site side via the internet 71.

Then, the user data 820 transmitted to the remote site side is processed by the AP server (virtual machine) 700 which is virtually created on the virtualization platform 400 on the remote site side. The processed user data is transmitted to the client machine 800.

When the attribute information 821 of the user data 820 is "confidential" as shown in FIG. 10B, the confidential data control section 331 judges that the user data 820 contains confidential information, and determines the destination of the user data 820 as the AP server (virtual machine) 700 which is migrated to the virtualization platform 100 on the local site side. The data main body 822 that is obtained through eliminating the attribute information 821 from the user data 820 by the confidential data control section 331 is transmitted by the proxy communication section 332 to the AP server 700 which is migrated to the virtualization platform 100 on the local site side by the migration function of the virtual machine service section 320. That is, when the attribute information 821 is "confidential", the data main body 822 is not transmitted to the remote site side. Thus, there is no risk of having information leakage.

FIG. 11 is an explanatory diagram showing the virtual network system of the web service system 1, when the AP server (virtual machine) 700 is migrated to the virtualization platform 100 on the local site side.

The AP server (virtual machine) 700 before the migration is connected to a virtual network 352 (corresponds to the virtual network 24a) which is virtually created on the virtualization platform 400 on the remote site side by the hypervisor 500.

As shown in FIG. 5 and FIG. 11, when the AP server (virtual machine) 700 of the virtualization platform 400 on the remote site side is migrated to the virtualization platform 100 on the local site side, a virtual network 351 (corresponds to the virtual network 24a) for making access to the migrated AP server (virtual machine) 700 is virtually created by the hypervisor 200 on the local site side, and a virtual network identifier 342a for identification is added to the virtual network 351. The virtual network identifier 342a is written to the transfer table 340 by the confidential data control section 331.

The migrated AP server (virtual machine) 700 is connected to the virtual network 351. The client machine 800 which has made access to the virtualization platform 100 on the local site side via the network 31 on the local site side is connected to the virtual network 351 under a control of the network processor 310 on the local site side, and the web browser 810 of the client machine 800 makes access to the AP server (virtual machine) 700 which is migrated to the virtualization platform 100 on the local site side via the network 31 on the local site side and the virtual network 351 on the local site side under a control of the proxy communication section 332 on the local site side.

When processing the user data containing no confidential information after executing the processing of the user data containing confidential information executed by the AP server (virtual machine) 700 which is migrated to the virtualization platform 100 on the local site side, the user data may also be processed by using the AP server (virtual machine) 700 which is migrated to the virtualization platform 100 on the local site side.

(Overall Actions of Exemplary Embodiment)

Next, overall actions of the above-described exemplary embodiment will be described. Described is a case where a web service method is performed by using the web service system according to the exemplary embodiment of the invention. First, the confidential data control section 331 judges whether or not the transmission data (user data 820) for the web service contains the confidential information (FIG. 9: steps S104-S105). When judged that the user data 820 contains the confidential information, the confidential data control section 331 executes migration of the AP server (virtual machine) 700 which is the virtual machine on which the AP service 710 is operated to the virtual machine system of the server machine 100 to have it mounted onto the virtual machine system (FIG. 9: step S106).

In a case where the AP server (virtual machine) 700 is migrated onto the virtualization platform 100 on the local site side, the confidential data control section 331 stores a set of the sender of the data and the virtual network identifier for making access to the virtual network to make access to the AP server (virtual machine) 700 in the transfer table 340 (FIG. 9: step S108).

Further, the confidential data control section 331 extracts a file from the user data 820 and judges whether or not the file contains attribute information which indicates whether or not the file contains the confidential information (FIG. 9: steps S101-S103). When judged that the file contains the attribute information, the confidential data control section 331 eliminates the attribute information (FIG. 9: step S109).

In the above, the case of creating the exemplary embodiment of the invention as the hardware has been described. However, the hardware structure shown in FIG. 1-FIG. 7 may also be formed as a program that is implemented on software. In that case, the program is recorded on a recording medium and handled as a subject of commercial transactions.

As described above, according to the exemplary embodiment of the invention, the communication form from the client machine to the remote site is structured as a form which relays the communication by separately establishing a session from the client machine to the local site and a session from the local site to the remote site. Therefore, it is possible to check the data that is sent out from the client to the remote site.

As described above, it is possible to check the data. Thus, in a case of data containing confidential information, it is possible to execute migration of a virtual machine operated on the remote site to the local site, and process the data on the local site by using the virtual machine. This makes it possible to prevent the data containing the confidential information from being leaked to the outside from the network. In addition, the data can be processed by utilizing migration of the virtual machine only when processing the data containing the confidential information, so that wasteful consumption of the computer resource on the local site can be prevented.

Furthermore, the user can process the data by utilizing the virtual machine whether the data contains the confidential information or not by simply establishing the session between the client machine and the local site, so that it is unnecessary to prepare a proper environment for executing processing of the data.

With the exemplary embodiment, the user data 820 whose attribute information 821 is "confidential" is not transmitted to the outside the local site via the Internet 11, as long as the attribute information 821 of the user data 820 is set properly. Therefore, there is no risk of causing information leakage in the first place. What is more, the user can enjoy the whole merit of utilizing the web base application, which is to make it possible for the user to be released from the troublesome work and time required for installation of the software to the respective client machines and for the maintenance thereof.

As an exemplary advantage according to the invention, the present invention creates the communication form from a client machine to a remote site as a form which relays communication by separately establishing a session from the client machine to the local site and a session from the local site to the remote site. Thus, it is possible to check the data transmitted from the client to the remote site.

As described above, it is possible with the present invention to check the data. Therefore, in a case of data containing confidential information, it is possible to execute migration of a virtual machine operated on the remote site to the local site, and process the data on the local site by using the virtual machine. This makes it possible to prevent the data containing the confidential information from being leaked to the outside from the network. In addition, the data can be processed by utilizing migration of the virtual machine only when processing the data containing the confidential information, so that wasteful consumption of the computer resource on the local site can be prevented.

Furthermore, the user can process the data by utilizing the virtual machine whether the data contains the confidential information or not by simply establishing the session between the client machine and the local site, so that it is unnecessary to prepare a proper environment for executing processing of the data.

(Modification Example of Exemplary Embodiment)

There are some modifications for the first exemplary embodiment described above. Those modification examples will be described hereinafter. While the exemplary embodiment above has been described to utilize the service virtual machine system, it is also possible to form the same structure only with the hypervisor without utilizing the service virtual machine system. It is because there is only a difference in the mount methods for implementing the virtualization system, and there is no specific difference on the appearance from the network. Further, there is also a case where such structure is implemented as a part of the OS functions or an application without using the hypervisor.

Further, while there are only two kinds in the attribute information in the above-described exemplary embodiment, i.e., "confidential" and "public", there may also be cases of setting three or more stages of classifications. In that case, the virtual machine system including the web proxy of the present invention may be formed as a multistage structure, and the position of the virtual machine system to which the AP server (virtual machine) is to be migrated may be changed in accordance with the set classification.

Furthermore, while the above-described embodiment is designed to judge the classification of the data according to the attribute information added to the user data, the classification of the data may also be judged according to the content itself of the data main body. In that case, possible methods used therefore are a method which directly scans the data and judges the classification according to the consistency with a keyword, and a method which directly scans the data and estimates the classification based on the dependent relationship with respect to the other data. Other than those methods, those skilled in the art can use any applicable methods for judging the classification of the data.

While the present invention has been described by referring to the specific exemplary embodiment shown in the drawings, the present invention is not limited only to such exemplary embodiment shown in the drawings. It is to be understood that any known structures can be employed, as long as the effects of the present invention can be achieved therewith.

INDUSTRIAL APPLICABILITY

The present invention can be utilized broadly to the systems which use the web base applications.

What is claimed is:

1. A web service system which processes user data provided from a client machine by using a virtual machine on a remote site side, the system comprising
    a virtualization platform on a local site side and a virtualization platform on the remote site side linked via a communication net, wherein
    the virtualization platform on the local site side comprises:
    a network processor which separately establishes a communication line connected to the client machine and a communication line connected to a network processor of the virtualization platform on the remote site side;
    a confidential data control section which judges whether or not the user data transmitted to the network processor on the local site side contains confidential information, and determines, based on a result of the judgment, the remote site side as a destination and a processor of the user data when the user data does not contain the confidential data, and determines the local site side as the destination and the processor of the user data when the user data contains the confidential information; and
    a virtual machine service section which, upon receiving the result of judgment made by the confidential data control section indicating that the user data contains the confidential information, executes migration of the virtual machine of the virtualization platform on the remote site side to the virtualization platform on the local site side based on information regarding an operation state of the virtual machine of the virtualization platform on the remote site side, wherein:
    the user data contains attribute information showing presence of the confidential information; and
    the confidential data control section judges whether or not the user data contains the confidential information based on the attribute information of the user data.

2. The web service system as claimed in claim 1, wherein:
    the network processor comprises a transfer table which stores address information of a sender of the data and an identifier of a virtual network; and
    the confidential data control section has a function which stores a set of the sender of the data and the identifier of the virtual network to which a web server belongs to the transfer table, in a case where the web server is migrated onto a first virtual machine system.

3. The web service system as claimed in claim 1, wherein:
    the confidential data control section has a function which extracts a file from the data transmitted to the web server to judge presence of attribute information which indicates whether or not the file contains confidential information, and eliminates the attribute information when the file contains the attribute information.

4. A web service method which processes user data provided from a client machine by using a virtual machine on a remote site side in a system including a virtualization platform on a local site side and a virtualization platform on the remote site side linked via a communication net, the method comprising:
- separately establishing, by a network processor of the virtualization platform on the local site side, a communication line connected to the client machine and a communication line connected to a network processor of the virtualization platform on the remote site side;
- judging, by a confidential data control section of the virtualization platform on the local site side, whether or not the user data transmitted to the network processor on the local site side contains confidential information, and determining, based on a result of the judgment, the remote site side as a destination and a processor of the user data when the user data does not contain the confidential data, and determining the local site side as the destination and the processor of the user data when the user data contains the confidential information; and
- upon receiving the result of judgment made by the confidential data control section indicating that the user data contains the confidential information, by a virtual machine service section of the virtualization platform on the local site side, executing migration of the virtual machine of the virtualization platform on the remote site side to the virtualization platform on the local site side based on information regarding an operation state of the virtual machine of the virtualization platform on the remote site side, wherein:
- the user data contains attribute information showing presence of the confidential information; and
- the confidential data control section judges whether or not the user data contains the confidential information based on the attribute information of the user data.

5. A non-transitory computer readable recording medium storing a program for executing control to process user data provided from a client machine by using a virtual machine on a remote site side, the program causing a computer, which forms a virtualization platform on a local site side that is linked to a virtualization platform on the remote site side via a communication net, to execute a method comprising:
- separately establishing, by a network processor of the virtualization platform on the local site side, a communication line connected to the client machine and a communication line connected to a network processor of the virtualization platform on the remote site side;
- judging, by a confidential data control section of the virtualization platform on the local site side, whether or not the user data transmitted to the network processor on the local site side contains confidential information, and determining, based on a result of the judgment, the remote site side as a destination and a processor of the user data when the user data does not contain the confidential data, and determining the local site side as the destination and the processor of the user data when the user data contains the confidential information; and
- upon receiving the result of judgment made by the confidential data control section indicating that the user data contains the confidential information, by a virtual machine service section of the virtualization platform on the local site side, executing migration of the virtual machine of the virtualization platform on the remote site side to the virtualization platform on the local site side based on information regarding an operation state of the virtual machine of the virtualization platform on the remote site side, wherein:
- the user data contains attribute information showing presence of the confidential information; and
- the confidential data control section judges whether or not the user data contains the confidential information based on the attribute information of the user data.

\* \* \* \* \*